United States Patent [19]

McWhorter

[11] 4,319,498

[45] Mar. 16, 1982

[54] RECIPROCATING ENGINE

[76] Inventor: Edward M. McWhorter, 6931 Greenbrook Cir., Citrus Heights, Calif. 95610

[21] Appl. No.: 47,106

[22] Filed: Jun. 11, 1979

[51] Int. Cl.³ .................... F16F 15/26; F02B 75/32
[52] U.S. Cl. .................................... 74/595; 74/579 E; 74/602; 74/604; 123/197 AC
[58] Field of Search ............... 74/595, 602, 603, 604, 74/579 E, 581; 123/197 AC

[56] References Cited

U.S. PATENT DOCUMENTS

| | | | |
|---|---|---|---|
| 1,872,763 | 8/1932 | Lee | 74/604 |
| 2,287,472 | 6/1942 | Eby | 74/602 X |
| 4,085,628 | 4/1978 | McWhorter | 74/602 X |

FOREIGN PATENT DOCUMENTS

| | | | |
|---|---|---|---|
| 802485 | 2/1951 | Fed. Rep. of Germany | 123/197 AC |
| 496102 | 7/1919 | France | 74/604 |

Primary Examiner—James Kee Chi

[57] ABSTRACT

The invention is a reciprocating mechanism for use in piston driven compressors and in internal and external combustion engines. The design comprises a piston and connecting rod which is driven by a crank with an intervening transfer linkage for extending and contracting the crank radius during each revolution of the crankshaft.

11 Claims, 15 Drawing Figures

RECIPROCATING ENGINE

BACKGROUND OF THE INVENTION

1. Field of the Invention

The invention relates to the field of variable clearance engines. The engine system also qualifies as an advanced reciprocating mechanism which refers to the fact that the movement of the piston is not entirely dependent on the simple harmonic motion induced by rotation of the crankpin.

2. Description of Prior Art

The crank radius of the conventional crankshaft is fixed and therefore the crankpin follows a circular path about the axial center of rotation of the main shafts. In this invention each throw of the crankshaft contains two crankpins. One of these crankpins, which is called the "primary crankpin", is fixed to the crank arm. The second crankpin is pivotally mounted on the primary crankpin by a disc shaped linkage and subscribes a quarter arc about the primary crankpin. The second crankpin is called the secondary transfer crankpin because it transfers loads to and from the piston to the crank arm. In pivoting about the primary crankpin the secondary transfer crankpin changes the effective crank radius. Most generally the secondary transfer crankpin is in the pivotal position which presents the shortest crank radius on the upstroke of the piston and then pivots to the position which presents the longest crank radius when the piston beings the downstroke. Operation in this manner improves the mechanical conversion process during the power stroke and decreases the pumping losses during the compression stroke.

In previous engines of the character described eccentrics have been used in conjunction with the crankshaft. Although the transfer linkage between the primary crankpin and the secondary crankpin is circular in shape it should not be confused with an eccentric. By definition an eccentric is a circular member in which the geometric center rotates about the eccentric center. In this application, as previously stated, the axial center of the secondary transfer crankpin rotates about the axial center of the primary crankpin. The transfer linkage is made circular so that the connecting rod can be mounted directly upon it and thus shorten the length of the secondary transfer crankpin. When the transfer linkage is not circular in shape the connecting rod must be mounted adjacent to the transfer linkage on the secondary transfer crankpin thus making it necessary to lengthen the secondary transfer crankpin.

SUMMARY OF THE INVENTION

It is the primary object of this invention to provide, in a manner hereinafter set forth, a means of increasing the cycle efficiency of piston driven reciprocating heat engines and compressible fluid pumps by alternately increasing and decreasing the crank radius. Further objects and advantages of the invention will become apparent from the study of the drawings and specifications presented.

BRIEF DESCRIPTION OF THE DRAWINGS

There is presented as part of the specification drawings showing the major elements of the reciprocating device.

DESCRIPTION OF THE PREFERRED EMBODIMENT

Figure 1:
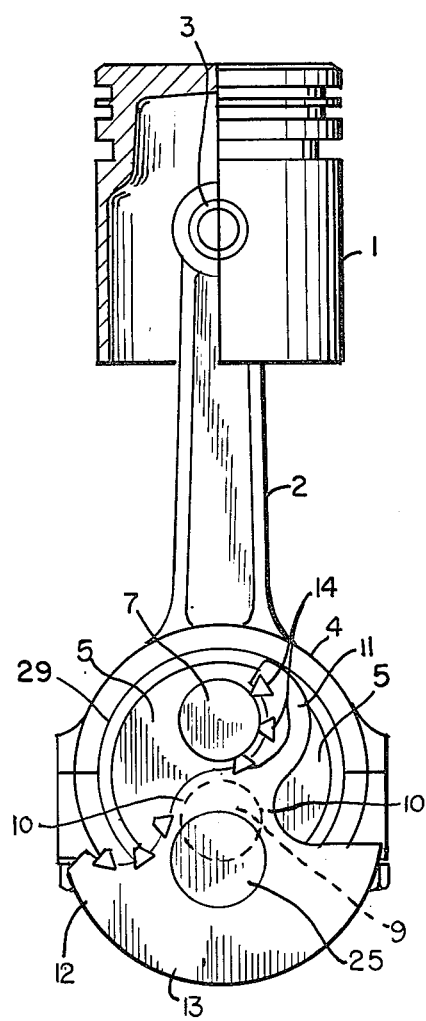
FIG. 1 is a frontal view of the reciprocating mechanism.
Figure 2:
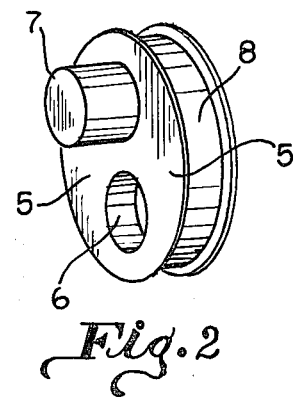
FIG. 2 is a perspective view of the transfer disc.

Referring now to the drawings and to FIG. 1 thereof in particular. FIG. 1 is a front view of the reciprocating mechanism showing piston 1 pivotally mounted on connecting rod 2 by pin 3. The major journal 4 of connecting rod 2 is rotatively mounted on transfer disc 5 with bearing 29 between. The details of transfer disc 5 are shown in FIG. 2. The transfer disc 5 is a short or flattened cylinder comprising a primary crankpin journal 6 bored on one side and protruding on the opposite side a secondary transfer crankpin 7. The edge of transfer disc 5 is machined as a peripheral bearing surface 8 for rotatively mounting in connecting rod 2 major journal 4.

Primary crankpin journal 6 is rotatively mounted on primary crankpin 9 shown as a dotted phantom line in FIG. 1.

Figure 3:
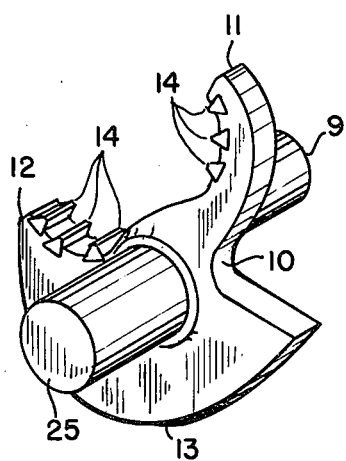
FIG. 3 is a perspective views of the crankshaft.

Referring now to FIG. 3 which is a perspective view of the crankshift manufactured as a single piece casting or forging comprising primary crankpin 9, crank arm 10, upper transfer bar 11, lower transfer bar 12 counterbalance 13 and mainshaft 25.

Three impactors 14 are flexibly mounted in the upper and lower transfer bars 11 and 12. The number of impactors 14 required depends on the size of the engine and on the operating conditions. Very small engine systems would require only one impactor on each of the lower and upper transfer bars.

Figure 4:
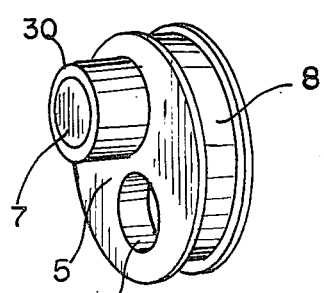
FIG. 4 is a perspective view of the transfer disc showing a variation of the impactor.

The impactors 14 are pieces of resilient rubber or plastic like material which soften the impact of the secondary transfer crankpin 7 with the upper and lower transfer bars when transfer disc 5 rotates on the primary crankpin 9. It will be noted that the same effect could be achieved by placing a tubular resilient rubber or plastic sheath 30 over the secondary transfer crankpin 7 as shown in FIG. 4.

Figure 5:
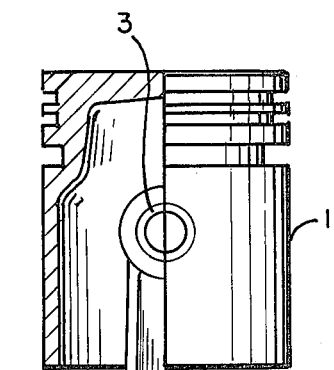
FIG. 5 is a frontal view of the reciprocating mechanism showing the spring loaded impactor.

A variation of the impactor device would employ a helical compression spring as shown in FIG. 5 at 2 places. As shown in FIG. 4, holes 15 and 16 are drilled in the upper and lower transfer bars 11 and 12 respectively. A resilient impactor 17 is slidably mounted in holes 15 and 16 and would protrude through the hole to engage the secondary transfer crankpin 7 in the same manner as impactors 14. Each impactor 17 contains a shoulder 18 which engage a shoulder 19 in holes 15 and 16 and thereby prevents them from being pushed out of holes 15 and 16 by spring 20. Screws 21 at the lower end of holes 15 and 16 hold springs 20 in place.

Figure 6:
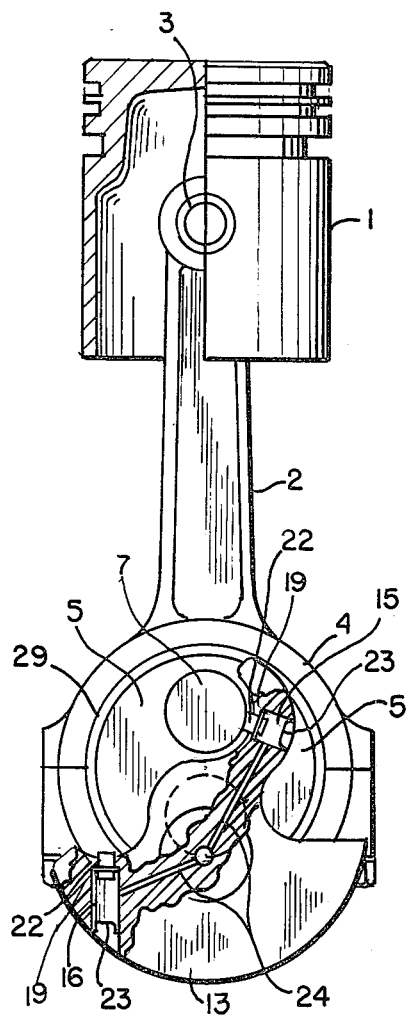
FIG. 6 is a frontal view of the reciprocating mechanism showing the hydraulically operated impactors.

Another variation of the impactor device would employ a hydraulic piston 22 operated by the lubricating oil circulating through drilled holes in main shaft 25 and primary crankpin 9 as shown in FIG. 6. The hydraulic piston 22 would have the same shape and dimensions as impactors 17 containing a shoulder which engages the shoulder 19 of holes 15 and 16 preventing the hydraulic pressure from pushing them out of holes 15 and 16. Holes 15 and 16 would be closed by a plug 23 at the other end. Lubricating oil flowing from hydraulic passages 24 drilled in the crankarm 10 would fill holes 15 and 16 assuring the necessary hydraulic pressure under hydraulic pistons 22.

Figure 8:
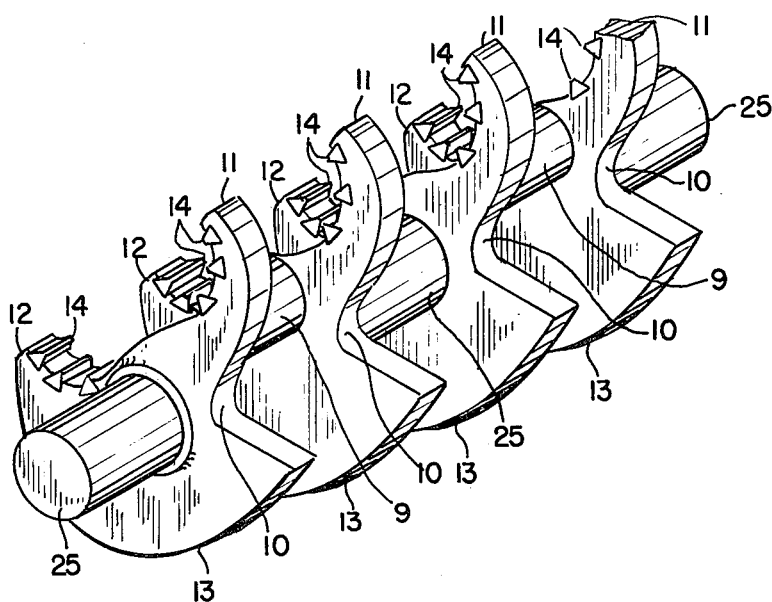
FIG. 8 shows a multiplethrow crankshaft.
Figure 7:
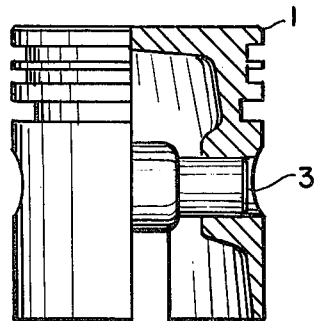
FIG. 7 is a side view of the reciprocating mechanism showing the connecting rod main journal and the transfer disc principally in cross-section.
Figure 7:
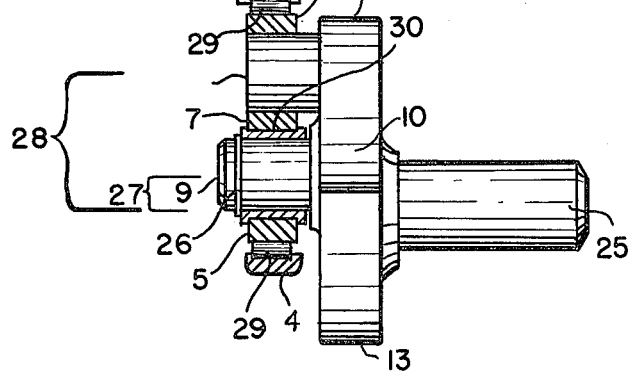

Turning now to FIG. 7 which is a side view of the reciprocating mechanism showing the major journal 4 of connecting rod 2 principally in cross-section. In order to facilitate the description the crankshaft shown in FIG. 3 is a simple overhung design comprising the primary crankpin 9, crankarm 10 counterweights 13 mainshaft 25 and the upper and lower transfer bars 11 and 12. Those skilled in the art will easily recognize the fact that the crankshaft described could be a multiple-throw crankshaft having a plurality of mainshafts, crankarms, crankpins, etc. without effecting changes in the novelty of the design, as shown in FIG. 8. Secondary transfer crankpin 7 is shown in FIG. 7 as being fixedly press-fit or as a shrink fit into transfer disc 5. In other types of manufacture the secondary transfer crankpin 7 could be fabricated as an integrally cast part of transfer disc 5.

In FIG. 7, transfer disc 5 is shown rotatively mounted on primary crankpin 9 with bearing 30 between. The transfer disc 5 and connecting rod 2 assembly is held on primary crankpin 9 by spring retainer ring 26. The fixed crank radius is the difference between the axial centers of primary crankpin 9 and mainshaft 25 and is designated by the bracket shown as element 27. The maximum variable crank radius is the difference between the axial centers of the secondary transfer crankpin 7 and the main shaft 25 and is designated by the bracket shown as element 28.

Figure 9:
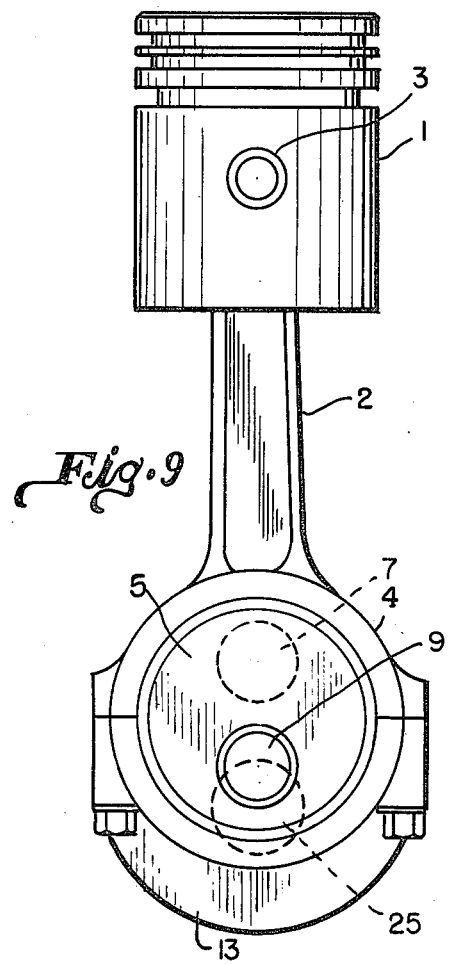
FIG. 9 is a rear view of the reciprocating mechanism.
Figure 15:
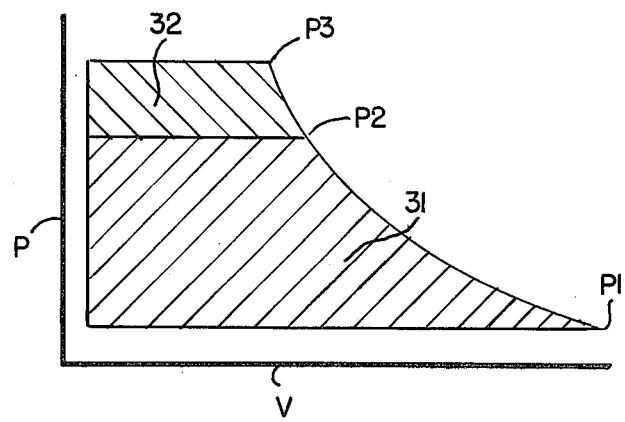
FIG. 15 is a pressure-volume diagram illustrating the relative effect of the primary and secondary transfer crankpins on the displacement when the mechanism is employed as a compressor.

FIG. 9 is a rear view of the reciprocating mechanism showing the various elements comprising the invention and is presented primarily for clarity.

Figures 10, 11, 12, 13, 14:
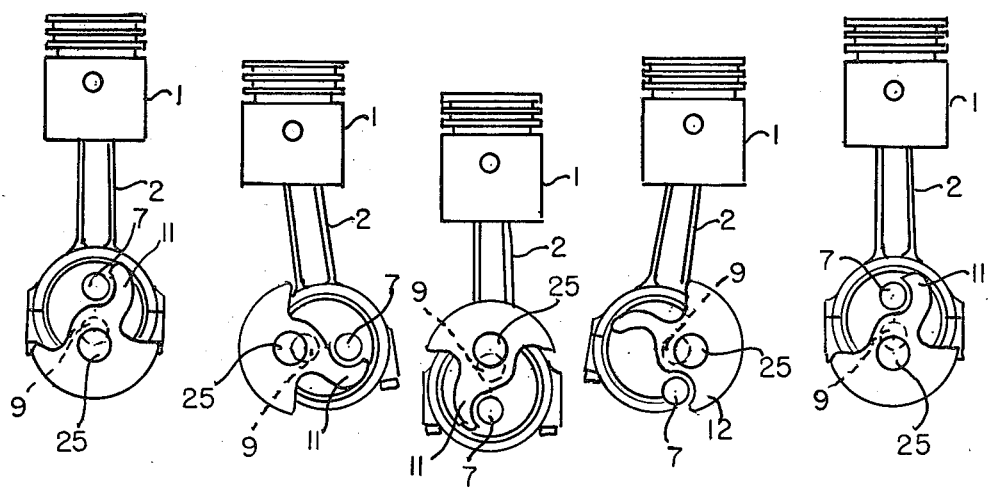
FIG. 10 is a diagramatic illustration of the mechanism at the top-neutral-center position of crank rotation.
FIG. 11 shows the mechanism at the 90° position of crank rotation.
FIG. 12 shows the mechanism at the bottom-neutral-center position of crank rotation.
FIG. 13 shows the mechanism at the 270° position of crank rotation.
FIG. 14 shows the mechanism once again at the top-neutral-center position of crank rotation.

Now to describe the manner in which the invention works. In this example the engine will be assumed to be an air compressor operating at a normal steady-state speed. In FIG. 10 the piston 1 is shown at the top-dead-center with the primary crankpin 9 at the top-neutral-center position of crank rotation. The secondary transfer crankpin 7 is in contact with the impactors 14 of the upper transfer bar 11. This is the position of maximum variable crank radius shown as element 28 in FIG. 7.

FIG. 11 the primary crankpin 9 is shown at the 90 degree position of crank rotation. The secondary transfer crankpin 7 is still in contact with impactors 14 of the upper transfer bar 11.

In FIG. 12 the piston 1 is shown at the bottom-dead-center with the primary crankpin 9 at the bottom-neutral-center position of crank rotation. The secondary transfer crankpin 7 is still in contact with impactors 14 of the upper transfer bar 11.

FIG. 13 shows the primary crankpin 9 at the 270 degree position of crank rotation. The combined system inertia of the piston and connecting rod assembly has caused the transfer disc 5 to rotate in major journal 4 such that the secondary transfer crankpin 7 now engages the impactors 16 of lower transfer bar 12. This greatly reduces the connecting rod 2 angularity and therefore reduces the amount of side thrust of the piston 1 within the cylinder and therefore lowers the sliding friction.

As the secondary crankpin 7 passes the 270 degree possition rotation the piston 1 attains a maximum acceleration within the cylinder. This is the point at which the line of action between the secondary transfer crankpin 7 and the main shaft 25 is perpendicular to the longitudinal line of action of connecting rod 2 passing from the centers of pin 3 and secondary transfer crankpin 7. At this point the piston 1 continues its rapid acceleration upward causing the transfer disc 5 to rotate on primary crankpin 9. The transfer disc 5 continues to rotate on primary crankpin 9 until the secondary transfer crankpin 7 engages the impactors 14 of upper transfer arm 11 with piston 1 once again in the top-dead-center position as shown in FIG. 14.

The advantages of the system when used as a compressor are seen to accrue from the differences in the fixed crank radius 27 and in the variable crank radius 28 shown in FIG. 7. Part of the piston 12 displacement is due to the fixed crank radius and another part of the displacement is due to the rotation of the transfer disc 5 on primary crankpin 9. If we assign the displacement pressure accredited to the fixed crank radius as from $P_1$ to $P_2$ and the remaining level of displacement pressure of the variable crank radius accredited to the rotation of the transfer disc 5 as $P_2$ to $P_3$ the total work designated as $W_{total}$ can then be presented as a function of the displacement volume and the change in pressure designated as V and dP respectively. This relationship may then be written simply as:

$$W_{total} = \int_{P_1}^{P_2} VdP + \int_{P_2}^{P_3} VdP \qquad \text{Equation 1}$$

The differential work $W_{diff.}$ produced by rotating the transfer disc 5 within the main journal 4 is approximately:

$$W_{diff.} = \int_{P_1}^{P_3} VdP - \int_{P_1}^{P_2} VdP \qquad \text{Equation 2}$$

The differential work $W_{diff.}$ shown in Equation 2 results from the upward inertia of connecting rod 2 and piston 1 which would be partially lost in the conventional reciprocating system. This relationship is shown diagramatically in FIG. 13. In FIG. 13 the abscissa represents the volume V of the displacement while the ordinate represents the pressure P within the cylinder during the upward displacement. The lower cross-hatch lines between $P_1$ and $P_2$ designated as 31 represent the pressure and volume displacement of the fixed crank radius 27 while the upper cross-hatching between $P_2$ and $P_3$ designated as 32 represent the pressure and volume displacement of the variable crank radius 28.

When the compressor is driven by an electrical motor the starting and running torque of the motor is proportional to the crank radius of the compressor. At slow rotational speeds the secondary transfer crankpin 7 is against the impactor 14 of the low transfer bar 12 and therefore the crank radius is minimum and the torque load on the electrical motor would be reduced. Therefore the starting torque and the normal load on the motor would be less during periods of peak electrical usage when the so-called brownouts are most apt to occur. This will prevent the motor from overheating and prematurely wearing out.

The invention also functions well as an internal combustion engine. The system is adaptable as a lean burn engine whose lean limit capability surpasses that of conventional engine systems. This results principally from the increased rate of compression as the piston is accelerated upward. The increased activity of colliding gas molecules above the piston at the increased rate of compression make possible the ignition and propagation of the combustion under extremely lean fuel-air mixtures.

What is claimed is:

1. A crankshaft comprising a plurality of axially aligned and axially spaced mainshafts, arms fixed on the adjacent ends of said mainshafts, a crankpin joining adjacent said arms forming a crankthrow of a crankshaft having a plurality of such crankthrows, upper and lower transfer bars rigidly attached to each said arm, said transfer bars holding a plurality of rigidly mounted resilient impactors, a transfer disc pivotally mounted on said crankpins, a secondary transfer crankpins fixedly attached to said transfer discs, said secondary transfer crankpins operating between said upper and lower transfer bars and intermittantly contacting said resilient impactors, a connecting rod having a major journal at one end for rotatively mounting on said transfer disc and smaller journal at the other end for pivotally attaching a piston.

2. The reciprocating mechanism of claim 1 in which the said resilient impactors are cushioned with springs.

3. The reciprocating mechanism of claim 1 in which the said resilient impactors are hydraulically pressured.

4. A crankshaft comprising a mainshaft, an arm, a primary crankpin, and a counterweight, an upper transfer bar fixedly attached to said arm at the upper end and a lower transfer bar fixedly attached to the lower end of said arm conjunctively with the said counterweight, said upper and lower transfer bars holding a plurality of rigidly mounted resilient impactors, a transfer disc pivotally mounted on said primary crankpin, a secondary transfer crankpin fixedly attached to said transfer disc, said secondary transfer crankpin operating alternately between said upper and lower transfer bars intermittantly contacting said resilient impactors, a connecting rod having a major journal at one end for rotatively mounting on said transfer disc and a smaller journal at the other end holding a pin for pivotally attaching a piston, said pin passing transversly through said piston.

5. The engine of claim 4 having a crankshaft comprising a plurality of axially aligned and axially spaced mainshafts, arms fixed on the adjacent ends of said mainshifts, primary crankpins joining adjacent said arms forming a crankthrow of a crankshaft having a plurality of such crankthrows, upper transfer bars fixedly attached to said arms at the upper end and lower transfer bars fixedly attached to the lower end of said arm conjunctively with said counterweights, said upper and lower transfer bars holding a plurality of rigidly mounted resilient impactors, transfer discs pivotally mounted on said primary crankpins, secondary transfer crankpins fixedly attached to said transfer discs, said secondary transfer crankpins operating alternately between said upper and lower transfer bars intermittantly contacting said resilient impactors, connecting rods having major journals at one end for rotatively mounting on said transfer discs and smaller journals at the other end holding pins for pivotally attaching pistons, said pins passing transversly through said pistons.

6. The reciprocating mechanism of claim 4 in which the said resilient impactors are cushioned with springs.

7. The reciprocating mechanism of claim 5 in which the said resilient impactors are cushioned with springs.

8. The reciprocating mechanism of claim 4 in which the said resilient impactors are hydraulically pressured.

9. The reciprocating mechanism of claim 5 in which the said resilient impactors are hydraulically pressured.

10. The reciprocating mechanism of claim 4 in which the said resilient impactors are replaced by a tubular resilient sheath mounted over the said secondary transfer crankpin.

11. The reciprocating mechanism of claim 5 in which the said resilient impactors are replaced by a tubular resilient sheath mounted over the said secondary transfer crankpin.

* * * * *